(12) United States Patent
Singh

(10) Patent No.: US 11,804,747 B2
(45) Date of Patent: Oct. 31, 2023

(54) COATED ARTICLE FOR AN ELECTRO-MECHANICAL DEVICE

(71) Applicant: Siemens Energy Global GmbH & Co. KG, Bayern (DE)

(72) Inventor: Narendra Singh, Rajasthan (IN)

(73) Assignee: Siemens Energy Global GmbH & Co. KG, Munich (DE)

( * ) Notice: Subject to any disclaimer, the term of this patent is extended or adjusted under 35 U.S.C. 154(b) by 514 days.

(21) Appl. No.: 17/261,326

(22) PCT Filed: Jul. 25, 2019

(86) PCT No.: PCT/EP2019/070070
§ 371 (c)(1),
(2) Date: Jan. 19, 2021

(87) PCT Pub. No.: WO2020/021025
PCT Pub. Date: Jan. 30, 2020

(65) Prior Publication Data
US 2021/0265888 A1 Aug. 26, 2021

(30) Foreign Application Priority Data
Jul. 25, 2018 (EP) ..................................... 18185504

(51) Int. Cl.
*H02K 3/24* (2006.01)
*H02K 3/22* (2006.01)
(Continued)

(52) U.S. Cl.
CPC ................. *H02K 3/24* (2013.01); *H02K 3/22* (2013.01); *H02K 9/225* (2021.01); *H02K 3/02* (2013.01)

(58) Field of Classification Search
CPC .. H02K 3/02; H02K 3/22; H02K 3/24; H02K 9/227
See application file for complete search history.

(56) References Cited

U.S. PATENT DOCUMENTS 9,705,370 B2 * 7/2017 Koyama ............ H02K 15/0093
2006/0102469 A1 5/2006 Wang
(Continued)

FOREIGN PATENT DOCUMENTS

CN 105375666 A 3/2016
DE 102016202071 A1 8/2017

OTHER PUBLICATIONS

PCT International Search Report dated Nov. 5, 2019 with international filing date Jul. 25, 2019 Application No. PCT/EP2019/070070.
(Continued)

*Primary Examiner* — Jue Zhang
(74) *Attorney, Agent, or Firm* — WOLTER VAN DYKE DAVIS, PLLC

(57) ABSTRACT

A coated article for an electro-mechanical which includes conductors carrying current therewithin, at least one heat convection enabling component disposed in an operable connection with one or more of the conductors, and a coating applied at least partially on the conductors and/or the at least one heat convection enabling component. The coating is a Graphene coating increasing current carrying capacity of the conductors and enhancing operational efficiency of the electro-mechanical device.

8 Claims, 5 Drawing Sheets

(51) Int. Cl.
*H02K 9/22* (2006.01)
*H02K 3/02* (2006.01)

(56) References Cited

U.S. PATENT DOCUMENTS

| | | |
|---|---|---|
| 2013/0069478 A1* | 3/2013 | Hamer .................... H02K 3/30 427/116 |
| 2015/0171687 A1 | 6/2015 | Koyama |
| 2019/0027988 A1 | 1/2019 | Filipenko |

OTHER PUBLICATIONS

European Search Report dated Jan. 23, 2019 with international filing date Jul. 25, 2018 Application No. EP 18 18 5504.

* cited by examiner

COATED ARTICLE FOR AN ELECTRO-MECHANICAL DEVICE

CROSS REFERENCE TO RELATED APPLICATIONS

This application is the US National Stage of International Application No. PCT/EP2019/070070 filed 25 Jul. 2019, and claims the benefit thereof. The International Application claims the benefit of European Application No. EP18185504 filed 25 Jul. 2018. All of the applications are incorporated by reference herein in their entirety.

FIELD OF INVENTION

The present invention relates to an electro-mechanical device, in particular a generator, having a rotor and a stator. More specifically, the present invention relates to coating one or more parts of the rotor to increase the current carrying capacity of the rotor.

BACKGROUND OF INVENTION

Such an electro-mechanical device is known to a person skilled in the art. Such a commonly known electro-mechanical device is, for example, an electric generator.

Typically, an operational rating of an electric generator, for example, a turbo-generator is largely dependent on the current carrying capacity of its windings, that is, stator windings and rotor windings. Heating of the rotor windings limits the turbo-generator operations at overexcited conditions, particularly when there is a requirement of the reactive power by the connected power grid. Thus, the operational rating of generators is largely dependent on the rotor windings. Conventionally, cooling arrangement such as water-cooling are employed for turbo-generators, especially, large turbo-generators for efficient cooling of the stator windings. However, the conventional cooling arrangements are not efficient when employed for rotating parts such as the rotor windings. The rotor windings are typically made of Copper due to its commercial viability, reasonable costs, as well as its high electrical & thermal conduction properties. Copper is typically used for the rotor windings in all large turbo-generators. However, despite of having high electrical & thermal conduction properties, copper coils also have limitations on current carrying capability, which is largely dependent on cooling of the coils, for example, heat removal from the surface of the coils.

FIG. 1 illustrates a sectional view of a rotor slot 100 having direct-cooled rotor windings, according to state of the art. As shown in FIG. 1, the rotor slot 100 comprises conductors 101, for example, copper coils housed within a rotor slot cell 102, and having ventilation channels 103 passing therewithin. Conventionally, electric generators, for example, large turbo-generators are designed to have direct-cooled rotor windings, in which several ventilation channels 103 are made in and around rotor coil cross-section, that is, conductors 101, in order to allow cooling gas to flow through these ventilation channels 103. The conductors 101 are separated from one another via inter-turn insulation layers 104. The ventilation channels 103 are positioned on each of the conductors 101. Typically, the rotor conductors 101 are made of Copper and conventional means of increasing the current carrying capacity of these conductors 101 is by increasing the cross-section or by increasing the cooling gas flow. However, due to constraints associated with physical dimensions of the generator, the current carrying capacity of these conductors 101 cannot be increased beyond a certain limit, which in turn decides the power rating of the generator.

Electro-mechanical devices such as electric generators of the aforementioned kind are known to employ composites such as Graphene for achieving effective power to weight ratio as these composites have better conductivity and lower losses compared to conventional materials such as Copper. Graphene is a newly discovered material having 2-dimensional properties and is a crystalline allotrope of carbon. Carbon atoms of Graphene are densely packed in a regular hexagon making Graphene a light yet strong compound, having high conduction of electricity and of heat at room temperature. However, conventional methods known to employ such composites, typically, are for conductors carrying alternating current that tends to flow through the conductor's outer surfaces due to skin effect, as opposed to a direct current that tends to flow throughout the conductor's cross-section.

From document US 2015/171687 A1 an armature winding of electrical rotating apparatus, an electrical rotating apparatus using the same, and a method of manufacturing the same is known. From document US 2006/102469 A1 an electroplating apparatus is known. From document DE 10 2016 202 071 A1 an electric conductor for an electric machine with enhanced power to weight ratio and an electric component for the electric machine are known.

SUMMARY OF INVENTION

Therefore, it is an object of the present invention to provide a coated article of an electro-mechanical device of the aforementioned kind having a plurality of conductors carrying current therewithin, and at least one heat convection enabling component disposed in operable connection with one or more of the conductors, such that the coated article increases current carrying capacity of the electro-mechanical device by employing enhanced heat convection, without compromising physical compactness and costs associated with the electro-mechanical device.

The coated article of an electro-mechanical device disclosed in the present invention achieves the aforementioned object, in that a coating is applied at least partially on the conductors and/or the heat convection enabling component.

In accordance with the present invention, a coated article for an electro-mechanical device, having a plurality of current carrying conductors in operable connection with at least one heat convection enabling component coated at least partially with a coating is provided. The conductors carry a direct current therewithin. As used herein, "coated article" is a rotatable component. In an embodiment according to the present invention, the rotatable component is a rotor of the electro-mechanical device. According to another embodiment of the present invention, the coated article is a rotor winding ventilation duct. According to another embodiment of the present invention, the coated article is a rotor sub-slot. The coated articles includes any suitable component such as, but not limited to, the rotor, a rotor shaft, a rotor slot, a rotor sub-slot, one or more current carrying parts within a rotor, or a combination thereof.

Also, used herein, "heat convection enabling component" refers to a temperature affecting component of the electro-mechanical device enabling the electro-mechanical device to maintain its temperature within predefined limits. According to an embodiment of the present invention, the heat convection enabling component is a ventilation channel disposed within the conductors. According to this embodiment, the ventilation channel includes that of an axially cooled rotor as well as a radially cooled rotor.

Also, used herein the term "coating" refers to a chemical compound comprising a Graphene derivative. The Graphene derivative includes, but is not limited to, a Graphitic oxide, a Graphene oxide, a Graphene, a functionalized Graphitic oxide, a functionalized Graphene oxide, a functionalized Graphene, or a combination thereof. Advantageously, the Graphene coating formed over the heat convection enabling component increases the current carrying capacity of the conductors because of its low electrical resistivity resulting in reduction of heating of the conductors and decrease in $I^2R$ losses. The decrease in $I^2R$ losses is proportional to a thickness of the coating. The thickness is largely governed by the manufacturing process being followed for the coating. Advantageously, the thickness of the coating is of about 0.5 millimetres to about 1 millimetre. Moreover, because of low thermal conductivity of Graphene, the heat dissipation in the conductors is enhanced thus resulting in an improved current carrying capacity of the conductors due to an increased flow of the excitation current in the rotor conductors. This increase in turn is utilized for power upgrades of the electro-mechanical device employing the coated article in its rotor. Furthermore, Graphene coating reduces corrosion caused in and around the conductors, thereby increasing life and operational efficiency of the electro-mechanical device such as an electric generator or an electric motor.

According to an embodiment of the present invention, the Graphene derivative is applied as a coating over any suitable surface of the conductors and/or the heat convection enabling component by any suitable application method. A suitable surface includes, but is not limited to, a substrate, a base coat over the substrate, a plurality of coatings over the substrate, or a combination thereof wherein the substrate refers to one or more surfaces of the conductors and/or the heat convection enabling components. Suitable application method comprises one or more of a plurality of processes comprising, for example, Chemical Vapour Deposition (CVD), screen printing, electrophoresis, thermal spray coating, low temperature application processes, and other chemical & electrochemical techniques or a combination thereof. Low temperature application processes include, but are not limited to, spray coating, painting, dipping, or a combination thereof.

Also disclosed herein is a rotor for an electro-mechanical device having a shaft and a winding wound within a plurality of rotor slots. One or more of the rotor slots are configured as a coated article comprising a plurality of conductors positioned within the rotor slots, and at least one heat convection enabling component in operable connection with one or more of the conductors.

Also disclosed herein is an electro-mechanical device having a stator and a rotor comprising a shaft and a winding wound within a plurality of rotor slots configured as the aforementioned coated article having a plurality of conductors positioned within the rotor slots, and at least one heat convection enabling component in operable connection with one or more of the conductors. The electromechanical device is an electric generator or an electric motor.

The above-mentioned and other features of the invention will now be addressed with reference to the accompanying drawings of the present invention. The illustrated embodiments are intended to illustrate, but not limit the invention.

BRIEF DESCRIPTION OF THE DRAWINGS

The present invention is further described hereinafter with reference to illustrated embodiments shown in the accompanying drawings, in which.

DETAILED DESCRIPTION OF INVENTION

Figure 1:
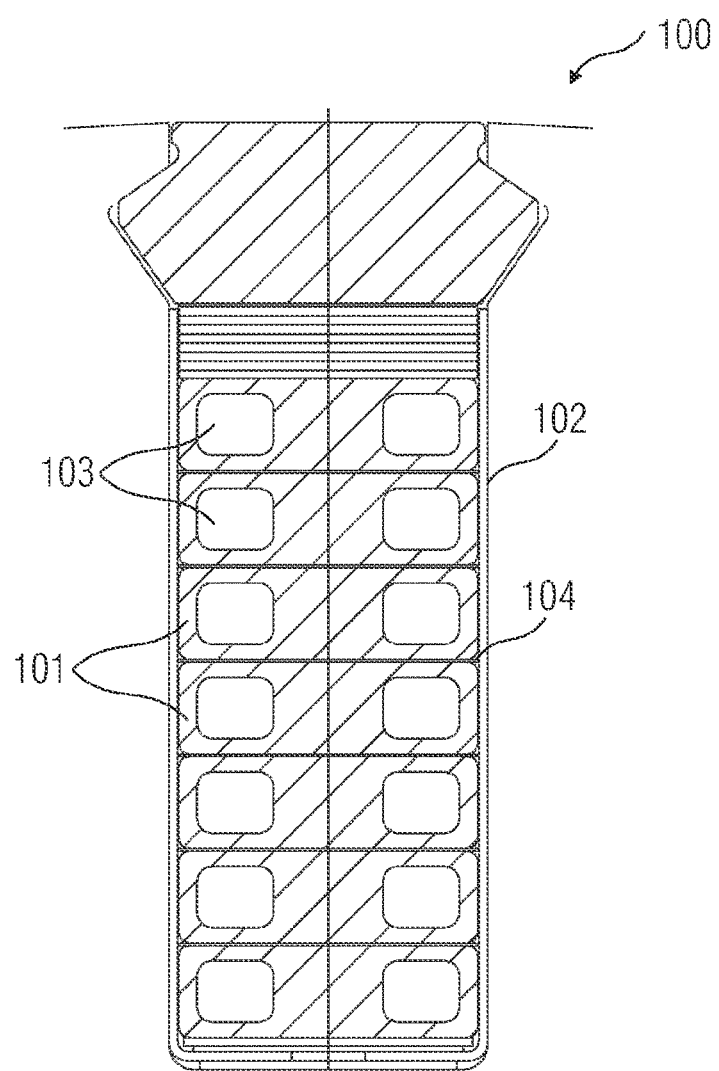
FIG. 1 illustrates a sectional view of a rotor slot having direct-cooled rotor windings, according to state of the art.

Various embodiments are described with reference to the drawings, wherein like reference numerals are used to refer to like elements throughout. In the following description, for the purpose of explanation, numerous specific details are set forth in order to provide thorough understanding of one or more embodiments. It may be evident that such embodiments may be practiced without these specific details.

Figure 2:
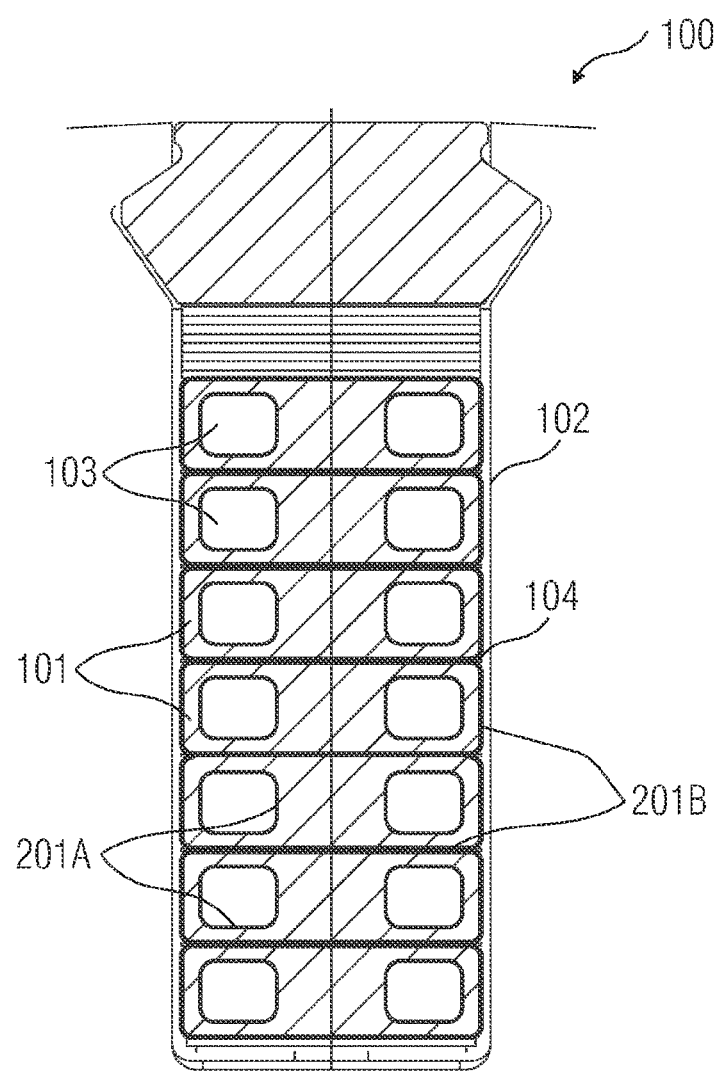
FIG. 2 illustrates a sectional view of a rotor slot having direct-cooled rotor windings, as an embodiment of a coated article in accordance to the present invention.

FIG. 2 illustrates a sectional view of a rotor slot 200 having direct-cooled rotor windings, as an embodiment of a coated article in accordance to the present invention. A slot cell 102 of the rotor slot 200 houses therewithin multiple conductors 101 forming a rotor winding, each turn of which is separated by an inter-turn insulation layer 104. The conductors 101 are made of Copper and carry a direct current therewithin. The rotor slot 200 comprises multiple ventilation channels 103 disposed within the conductors 101. The rotor slot 200 comprises Graphene coating 201A, 201B as shown in FIG. 2. Graphene coating 201A is deposited on inner walls of each of the ventilation channels 103. Graphene coating 201B is deposited on outer surfaces of the conductors 101 such that the Graphene coating 201B is sandwiched between the conductor 101 and the inter-turn insulation layer 104, and between the conductor 101 and the slot cell 102. The Graphene coating 201A, 201B is in a thickness ranging about 0.5 mm to 1 mm. The Graphene coating 201A inside the ventilation channels 103 allows more heat to be removed via cooling media circulated in the rotor directly. The Graphene coating 201B on the outer surfaces of the conductors 101 allows more heat to conduct to the rotor body and/or end region of the rotor, from where the heat will be removed via the cooling media. This allows flow of additional current through the rotor, that is, the conductors 101, thereby, increasing the current carrying capacity of the rotor.

Figure 3A:
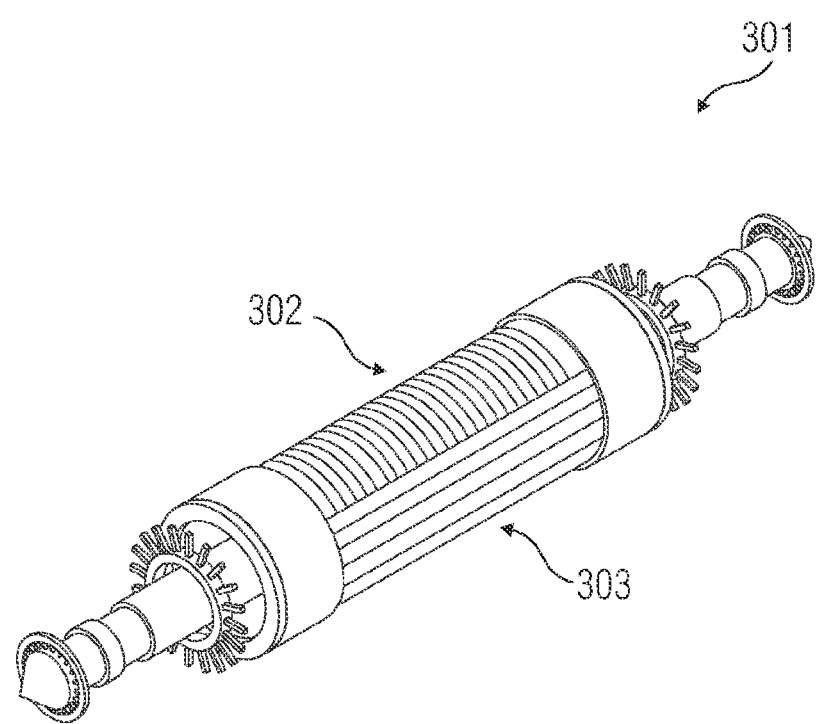
FIGS. 3A-3B illustrate a rotor of an electric generator, comprising rotor slots shown in FIG. 2, as an embodiment of a coated article in accordance to the present invention.
Figure 3B:
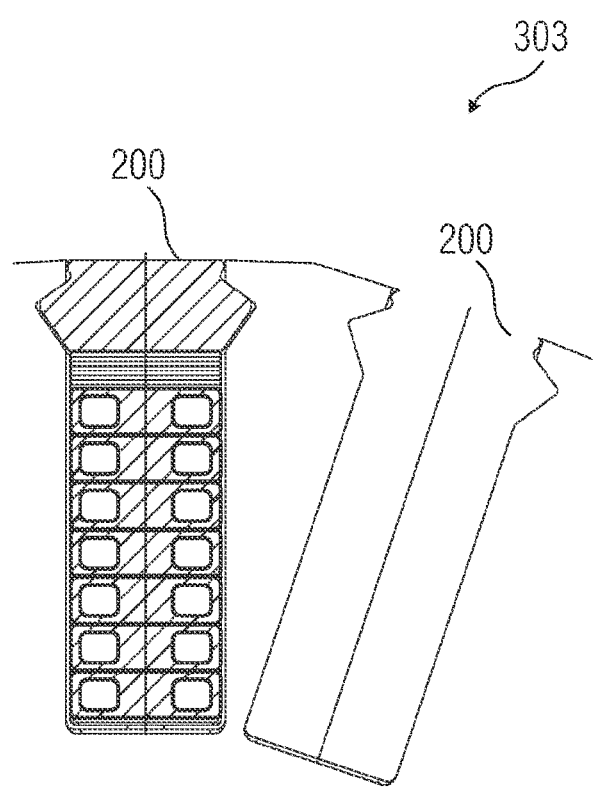

FIGS. 3A-3B illustrate a rotor 301 of an electric generator, comprising rotor slots 200 shown in FIG. 2, as an embodiment of a coated article in accordance to the present invention. FIG. 3A illustrates the rotor 301 comprising a shaft 302 having about two third of its peripheral area 303 covered with windings inserted into rotor slots 200. FIG. 3B illustrates rotor slots 200 made in the rotor shaft 303, each configured as a coated article disclosed in the detailed description of FIG. 2.

Figure 4:
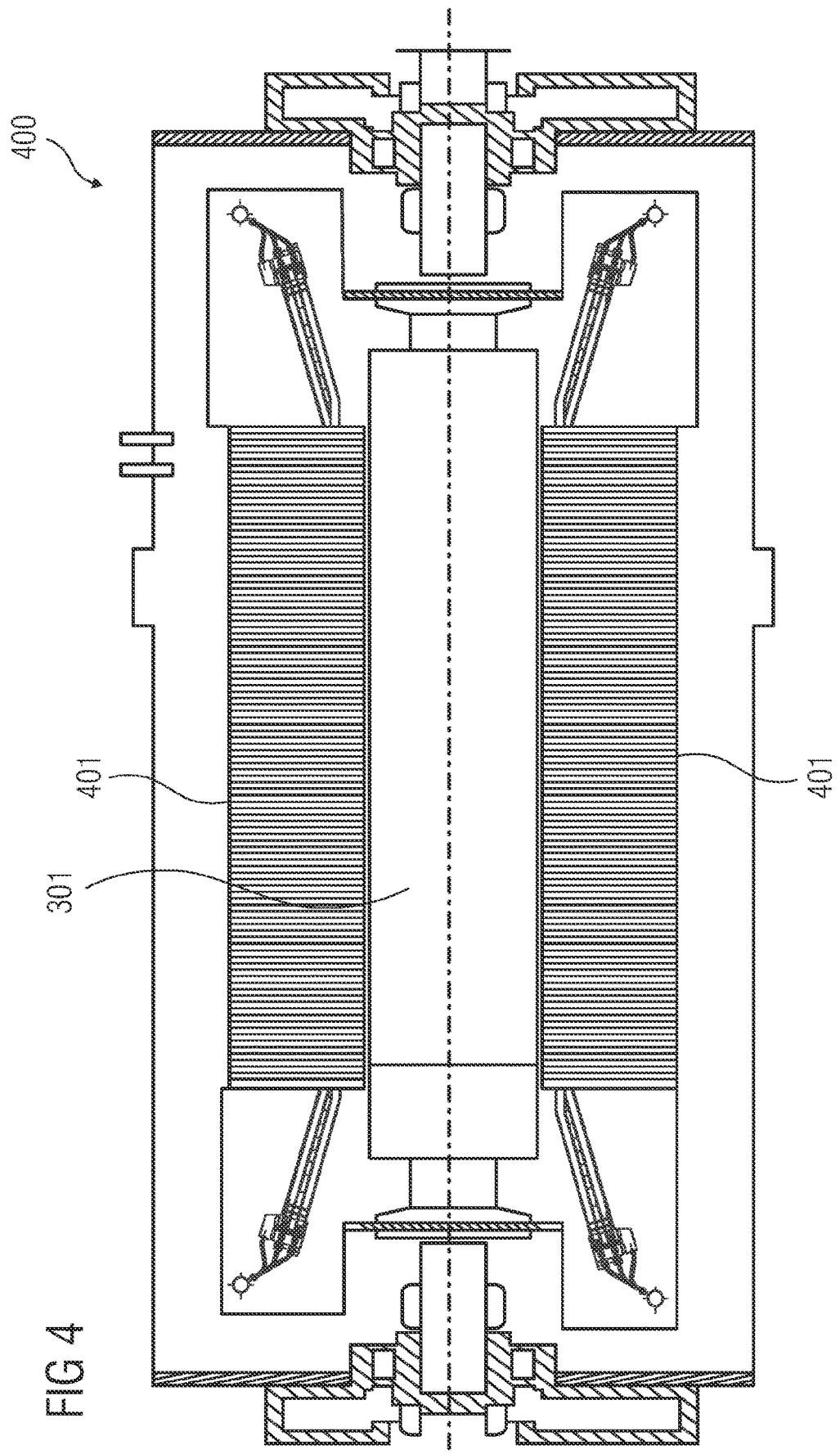
FIG. 4 illustrates a sectional view of an active part of an electric generator having a stator and a rotor with the rotor slots shown in FIG. 2, in accordance to the present invention.

FIG. 4 illustrates a sectional view of an active part of an electric generator 400 having a stator 401 and a rotor 301 with the rotor slots 200 shown in FIG. 2, in accordance to the present invention. The rotor 301 is as disclosed in the detailed description of FIGS. 3A, 3B. The rotor slots 200 are configured as a coated article as disclosed in the detailed description of FIG. 2.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

The invention claimed is:

1. A coated article for an electro-mechanical device, comprising:
    a plurality of conductors carrying a direct current therewithin;
    at least one heat convection enabling component disposed in operable connection with one or more of the plurality of conductors, wherein the heat convection enabling component is a ventilation channel disposed within the conductors;
    a coating applied at least partially on one or more of the plurality of conductors and the at least one heat convection enabling component, wherein the coating comprises a Graphene derivative.

2. The coated article according to claim 1, wherein the coating is of a thickness of about 0.5 millimetres to about 1 millimetre.

3. The coated article according to claim 1, wherein the coated article is a rotatable component.

4. The coated article according to the claim 3, wherein the rotatable component is a rotor of the electromechanical device.

5. A rotor for an electro-mechanical device, comprising:
    a shaft;
    a winding wound within a plurality of rotor slots, wherein one or more of the rotor slots are configured as a coated article comprising a plurality of conductors positioned within the rotor slots, and
    at least one heat convection enabling component in operable connection with one or more of the conductors, having a coating, according to claim 1.

6. An electro-mechanical device, comprising:
    a stator; and
    a rotor according to claim 5.

7. The electromechanical device according to claim 6, comprising:
    one of an electric generator.

8. The electromechanical device according to claim 6, comprising:
    an electric motor.

* * * * *